United States Patent Office 3,284,547
Patented Nov. 8, 1966

3,284,547
PHOSPHORIC ESTERS
Jean Metivier and Michel Sauli, both of Paris, France, assignors to Rhone-Poulenc S.A., Paris, France, a corporation of France
No Drawing. Filed Jan. 3, 1966, Ser. No. 517,993
Claims priority, application France, Jan. 5, 1965, 880
2 Claims. (Cl. 260—941)

This invention relates to new phosphoric esters, to a process for their preparation and to pesticidal compositions containing them.

According to the present invention there are provided the new phosphoric esters of the formula:

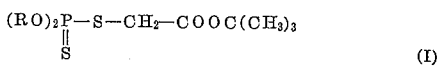
(I)

wherein R represents a methyl or ethyl group, which possess remarkable insecticidal and acaricidal properties.

According to a feature of the present invention, the aforesaid phosphoric esters are prepared by reacting an alkali metal or ammonium salt of a dialkyldithiophosphoric acid of the formula:

(II)

wherein R is as hereinbefore defined, with an acetic ester of the formula:

$$X-CH_2-COOC(CH_3)_3 \quad (III)$$

wherein X represents the acid residue of a reactive ester, preferably a halogen atom.

The reaction is advantageously carried out in an inert organic solvent, and more particularly in an alcohol (e.g. ethanol), a ketone (e.g. acetone or methyl ethyl ketone) or an aromatic hydrocarbon (e.g. benzene or toluene), at a temperature between ambient temperature and 120° C.

Phosphoric esters analogous to those of Formula I are already known, for example from French Patent No. 1,132,839 applied for October 18, 1955. Two particular known products are those of the formula:

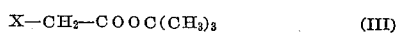

hereinafter called "Compound A," which is commercially available, and of the formula:

$$(C_2H_5O)_2-\underset{\underset{S}{\|}}{P}-S-CH_2-COOCH_2CH(CH_3)_2$$

hereinafter called "Compound B," which from its structure most closely resembles the phosphoric esters of Formula I. It is known that Compounds A and B are useful as insecticides.

It has been found after research and experimentation that the two hitherto unknown phosphoric esters of Formula I, that is the compounds of formulae:

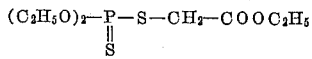

and

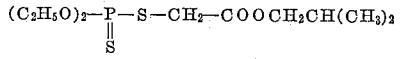

hereinafter referred to as Compounds C and D, respectively, possess insecticidal and acaricidal properties much superior to those of Compounds A and B. This superiority is shown by the results obtained in the following tests:

Test (1)—Contact insecticidal activity
(housefly—Tribolium)

1 cc. of an acetone solution of the product to be studied, at a given concentration, is sprayed into a 125 cc. glass jar. When the solvent has evaporated, the insects are placed in the jars and the jars are covered with wire gauze. The dose, in mg./l., which leads to 90% mortality ($LC_{90}$) is determined.

Test (2)—Direct treatment using an "AGLA" micrometric syringe (housefly—cricket)

A drop of the solution of the product to be studied in a mixture of acetone (90%) and water (10%) is placed, by means of an "AGLA" micrometric syringe, at the junction of the thorax and the head in the case of the cricket (0.004 cc.) or on the prothorax in the case of female flies (0.001 cc.), the insects being anaesthetised with carbon dioxide. Different concentrations are used and the mortality determined 24 hours after treatment in the case of the flies and 3 days after treatment in the case of the crickets. The dose in microgrammes per insect which produces a mortality of 50% ($LD_{50}$) is determined.

Test (3)—Effectiveness by ingestion-contact (a) On red spiders (Tetranychus telarius).—Cotyledonous leaves of French bean plants are soaked for 10 seconds in the solutions to be studied. When they are dry they are infested with red spiders. Mortalities are assessed after 4 days and the concentration in mg./l. producing 90% mortality ($LC_{90}$) is determined.

(b) On Plutella caterpillars.—Young cabbage leaves are soaked for 10 seconds in the solutions to be studied. When they are dry they are infested with caterpillars (3rd stage) of Plutella maculipennis. The assessments of mortality are carried out 3 days after the treatment, and the concentration in mg./l. producing 90% mortality ($LC_{90}$) is determined.

Test (4)—Ovicidal test (red spiders)

Emulsions are prepared with the aid of dimethylformamide and of sodium sulphoricinoleate. Eggs, fixed to a leaf disc are soaked for 10 seconds in the solution to be studied, fixed on a glass slide (gum arabic) and counted; all mobile forms are eliminated. Each disc is surrounded by a ring of soft petroleum jelly and is kept at 25° C. for 8 days. The number of young larvae trapped in the petroleum jelly is then counted, and the percentage of eggs killed determined. The dose in mg./l. causing 90% mortality ($LC_{90}$) is determined.

Test (5)—Greenhouse tests

Cabbages at the three-leaf stage, nasturtiums at the two-leaf stage, broad beans at the three-leaf stage and French beans at the two-trifoliate-leaf stage are planted in pots, with one cabbage, three nasturtiums, one broad bean or two French bean plants per pot. Twenty-four hours later these plants are treated by spraying with the solutions to be studied. The treated plants, once dried, are kept in the green house in a well ventilated small cell. The plants are infested, a certain number of days (N) after treatment, by suitable arthropods. The mortalities are determined three days after each introduction of parasites. At each concentration in g./hl. there is determined the value of N (in days) at which a mortality of greater than 90% is produced.

The results obtained in all the tests are summarised in Tables I and II.

TABLE I

| Compound | Test (1) | | Test (2) | | Test (3) | | Test (4) |
|---|---|---|---|---|---|---|---|
| | Housefly LC₉₀, mg./l. | Tribolium LC₉₀, mg./l. | Housefly LD₅₀, μg./insect. | Cricket LD₅₀, μg./insect. | Red spider LC₉₀, mg./l. | Plutella Caterpillar LC₉₀, mg./l. | Red spider LC₉₀, mg./l. |
| A | 3 | 500 | 0.25 | >30 | >300 | >300 | >1,000 |
| B | 10 | 300 | 0.80 | >30 | >30 | >30 | >1,000 |
| C | 1 | 30 | 0.07 | 15 | ≤30 | ≤10 | 300 |
| D | 3 | 10 | 0.16 | 3 | 50 | 30 | >1,000 |

TABLE II

| Compound | Test (5) | | | | | | | |
|---|---|---|---|---|---|---|---|---|
| | Cabbage (Plutella Caterpillar) | | Nasturtium (Aphis rumicis) | | Broad Bean (Macrosiphum pisi) | | French Bean (Tetranychus telarius) | |
| | Concentration, g./hl. | N (days) | Concentration, g./hl. | N (days) | Concentration, g./hl. | N (days) | Concentration, g./hl. | N (days) |
| A | 80 | Inactive | 80 | Inactive | 80 | Inactive | 80 | Inactive |
| B | 80 | Inactive | 80 | Inactive | 80 | Inactive | 80 | Inactive |
| C | 40 | >2 | 40 | 1 | 40 | 1 | 40 | 2 |
|   | 80 | >2 | 80 | 1 | 80 | 1 | 80 | 2 |
| D | 40 | 2 | 40 | 1 | 40 | 1 | 40 | 3 |
|   | 80 | >2 | 80 | 1 | 80 | 1 | 80 | 4 |

These results show that in all the tests employed the phosphoric esters of the present invention (Compounds C and D) are clearly more effective as pesticides than the known compounds A and B.

According to a further feature of the present invention there are provided pesticidal compositions containing one or both of the phosphoric esters of Formula I in association with one or more diluents compatible with the phosphoric ester and suitable for use in agricultural pesticidal composition. Preferably the compositions contain between 0.005 and 90% by weight of phosphoric ester. The compositions may be solid if there is employed a powdered solid compatible diluent such as talc, calcined magnesia, kieselguhr, tricalcium phosphate, powdered cork, absorbent charcoal, or a clay such as kaolin or bentonite. Instead of a solid diluent, there may be used a liquid in which the phosphoric ester is dissolved or dispersed. The compositions may thus take the form of suspensions, emulsions or solutions in organic or aqueous-organic media, for example aromatic hydrocarbons such as toluene or xylene or mineral, animal or vegetable oils, or mixtures of these diluents. The compositions in the form of suspensions, emulsions or solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When desired, emulsions of the phosphoric esters may be used in the form of self-emulsifying concentrates containing the active substance dissolved in the emulsifying agent or in a solvent containing an emulsifying agent compatible with the phosphoric ester and solvent, simple addition of water to such concentrates producing compositions ready for use.

The solid compositions are preferably prepared by grinding the phosphoric ester with the solid diluent, or by impregnating the solid diluent with a solution of the phosphoric ester in a volatile solvent, evaporating the solvent, and if necessary grinding the product so as to obtain a powder, and may optionally incorporate a wetting or dispersing agent, for example of the types hereinbefore described.

The phosphoric esters of Formula I are preferably employed for pesticidal purposes in a quantity of 5 to 80 g. of phosphoric ester per hectolitre of water.

The following examples illustrate the preparation of the phosphoric esters of the invention.

EXAMPLE I

Ammonium O,O-diethyldithiophosphate (102 g.) is added to a solution of tert.-butyl chloroacetate (75.3 g.) in acetone (500 cc.). The mixture is stirred for 8 hours at laboratory temperature. After standing overnight, the precipitate of ammonium chloride which has formed is filtered off and the acetone solution is concentrated under reduced pressure. The oil which remains is taken up in methylene chloride (250 cc.) and the solution obtained is washed successively with water (250 cc.) a 10% aqueous solution of potassium bicarbonate (200 cc.) and water (200 cc.). After drying over sodium sulphate and concentration under reduced pressure, tert.-butyl O,O-diethyldithiophosphorylacetate (147 g.) is obtained in the form of an oil distilling at 125°–127° C./0.5 mm. Hg.

The tert.-butyl chloroacetate employed as starting material is prepared according to Baker, Org. Synth., 24, 21 (1944).

EXAMPLE II

A mixture of ammonium O,O-dimethyldithiophosphate (19 g.) and tert.-butyl chloroacetate (15 g.) in acetone (100 cc.) is stirred for 8 hours at laboratory temperature. After standing overnight, the ammonium chloride precipitate formed is filtered off and the acetone solution concentrated under reduced pressure. The residual oil is taken up in methylene chloride (150 cc.) and the solution obtained is treated in the same way as described in Example I. After drying over sodium sulphate and concentration under reduced pressure, tert.-butyl O,O-dimethyldithiophosphorylacetate (24 g.) is obtained in the form of an oil.

The following examples illustrate pesticidal compositions according to the invention.

EXAMPLE III 5 parts of a condensation product of octylphenol and ethylene oxide, having 10 moles of ethylene oxide per mole of octylphenol, are added to a solution of 25 parts of tert.-butyl O,O-diethyldithiophosphorylacetate in 20 parts of xylene. The solution obtained is, after appropriate dilution with water, used to destroy aphids, red spiders and caterpillars. Depending on the desired effect, concentrations of 5 to 50 g. of active material per hectolitre are needed to get good results.

EXAMPLE IV 5 parts of tert.-butyl O,O-diethyldithiophosphorylacetate are intimately mixed with 95 parts of talc. After grinding, the powder obtained is used to destroy the same parasites as mentioned in Example III.

The parts mentioned in Examples III and IV are parts by weight.

We claim:
1. Phosphoric esters of the formula:

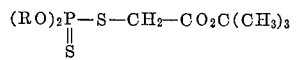

wherein R represents methyl or ethyl.
2. The phosphoric ester according to claim 1 wherein R represents ethyl.

No references cited.

CHARLES B. PARKER, *Primary Examiner*.
FRANK M. SIKORA, *Assistant Examiner*.

Notice of Adverse Decision in Interference

In Interference No. 96,246 involving Patent No. 3,284,547, J. Metivier and M. Sauli, PHOSPHORIC ESTERS, final judgment adverse to the patentees was rendered May 28, 1969, as to claims 1 and 2.

[*Official Gazette November 25, 1969.*]